Patented Aug. 20, 1935

2,011,569

UNITED STATES PATENT OFFICE 2,011,569

PROCESS FOR THE MANUFACTURE OF METHYLAMINE

Henry Dreyfus, London, England

No Drawing. Application February 11, 1933, Serial No. 656,366. In Great Britain March 9, 1932

13 Claims. (Cl. 260—127)

This invention relates to the production of methylamine.

According to the invention methylamine is produced by treatment of solutions or suspensions and particularly aqueous solutions or suspensions of cyanides with hydrogen (or gas containing and preferably rich in the same) in the presence of a hydrogenating catalyst. As examples of hydrogenating catalysts particularly suitable for employment in the process may be mentioned those consisting of or comprising the metals nickel, copper, zinc, iron, cobalt, tin and silver which may be present in any convenient form, for example as a colloidal dispersion or other suspension of the finely divided metals.

Alkali metal cyanides e. g. sodium cyanide, potassium cyanide, potassium ferro-cyanide and earth alkali cyanides are very suitable for employment in the process of the invention and so likewise are the cyanides of hydrogenating metals, i. e. metals, such as those specified above, which are capable of acting as hydrogenating catalysts. When cyanides of hydrogenating metals are employed the use of additional hydrogenating catalysts may, if desired, be dispensed with. Preferably, when cyanides of hydrogenating metals are treated by the process of the present invention, they are used at least partly in the form of their double compounds with alkali metal cyanides.

The cyanide solutions or suspensions employed may be acid, neutral or alkaline in reaction as desired. When acid solutions are employed the amount of acid present may be equal to or less than that equivalent to the cyanide employed or, if desired, sufficient acid may also be present to combine with all or part of the methylamine subsequently formed. Preferably, however, neutral or alkaline solutions or suspensions of the cyanides are employed.

The reaction, the chief product of which is mono-methylamine, may be caused to take place as desired at normal, super-atmospheric or reduced pressure.

In carrying out the process of the invention elevated temperatures and especially temperatures approaching the boiling point, under the pressure obtaining, of the medium in which the cyanides are dissolved or suspended are preferably employed. For instance, when treating aqueous solutions or suspensions temperatures of between 70 and 95° C. are especially suitable when using pressures at or about ordinary atmospheric pressure, whilst temperatures of between 70 and 230° C., and especially between 150 and 200° C., are advantageous when high pressures, e. g. up to 20 atmospheres, are employed.

The hydrogen may be caused to react in any convenient manner, for instance it may be passed in a stream through the cyanide solution or suspension which is maintained at a suitable temperature; in this manner (providing the solution does not contain free acid) the methylamine formed can be distilled or carried away by the gas stream. Further, hydrogen may be forced into the solution or suspension, contained in a pressure vessel maintained at a suitable temperature, until no more hydrogen is absorbed.

If desired, cyanide used up in the reaction vessel may be replenished by continuous or intermittent addition of hydrogen cyanide. Thus hydrogen cyanide may be passed in together with the hydrogen.

When hydrogen cyanide is used in admixture with hydrogen, preferably mixtures containing a considerable proportion of hydrogen, for example about 10 to 16 or more volumes of hydrogen to one volume of hydrogen cyanide, are employed. The mixture of hydrogen and hydrogen cyanide, when employed, may of course be obtained in any desired manner, for example by simple admixture of the gases or by passing hydrogen in a regulated stream over or through liquid hydrogen cyanide.

In cases where the gases are passed through the solution in a stream the gases, after treatment to remove the methylamine, may be recirculated through the apparatus.

The reaction vessel containing the cyanide solution or suspension may, when the process is carried out as a continuous operation, be provided with means whereby water may be added to replace that removed by evaporation during the process.

Methylamine produced by the process can be recovered or separated in any convenient way. Where the hydrogen (or gas containing the same) is passed in a stream through the solution or suspension, whether or not hydrogen cyanide is passed in contact with the solution or suspension, the methylamine, if present in the free state, can be largely or entirely removed or carried over by the gas stream, especially when raised or elevated temperatures are employed and recovered from the gas stream for instance by condensation and/or by absorption by water and/or acid.

Methylamine contained or remaining in the solution or suspension employed can be recovered in any convenient manner, e. g. by distillation with or without passage of inert gases through the solutions or suspensions, alkali being added first in cases where the process is performed in an acid medium (e. g. in the presence of hydrochloric acid or the like).

The following examples illustrate the invention which is not, however, limited thereto.

*Example 1*

A slight excess of sodium carbonate is added to a solution of nickel sulphate containing finely divided pumice in suspension. The product is filtered and the residue, after being washed, is dried and reduced in a current of hydrogen at 250 to 300° C.

The catalyst thus produced is suspended in a 30% solution of potassium cyanide contained in an autoclave fitted with stirrers, the autoclave is closed and heated to 175–180° C. and hydrogen is pumped in to a pressure of about 15 atmospheres.

When the absorption of hydrogen has practically ceased the hydrogen supply is stopped and the autoclave is cooled to 90–95° C. and opened, the gases and vapours leaving the autoclave being passed through a water cooled condenser provided with a receiver and the uncondensed gases scrubbed with dilute hydrochloric acid to recover escaping methylamine. The contents of the autoclave are distilled until free from methylamine.

Example 2

Freshly precipitated nickel cyanide is suspended in five times its weight of water and a quantity, equal to 11 times the weight of nickel cyanide used, of a saturated (at 15° C.) solution of potassium cyanide is added.

The well stirred mixture is then treated as in Example 1.

What I claim and desire to secure by Letters Patent is:—

1. Process for the manufacture of methylamine which comprises subjecting a solution or suspension of a metal cyanide to treatment with hydrogen in presence of a hydrogenating catalyst, said solution or suspension containing —CN ions as the only acid ions present.

2. Process for the manufacture of methylamine which comprises subjecting an aqueous solution or suspension of an alkali metal cyanide to treatment with hydrogen in presence of a hydrogenating catalyst, said solution or suspension containing —CN ions as the only acid ions present.

3. Process for the manufacture of methylamine which comprises subjecting an aqueous solution or suspension of an alkali metal cyanide to treatment with hydrogen in presence of a hydrogenating metal selected from the group consisting of nickel, copper, zinc, iron, cobalt, tin and silver, said solution or suspension containing —CN ions as the only acid ions present.

4. Process for the manufacture of methylamine which comprises subjecting an aqueous solution or suspension of a cyanide of a hydrogenating metal to treatment with hydrogen, said solution or suspension containing —CN ions as the only acid ions present.

5. Process for the manufacture of methylamine which comprises subjecting a solution or suspension of a cyanide of a hydrogenating metal selected from the group consisting of nickel, copper, zinc, iron, cobalt, tin and silver to treatment with hydrogen, said solution or suspension containing —CN ions as the only acid ions present.

6. Process for the manufacture of methylamine which comprises subjecting an aqueous solution or suspension of an alkali metal cyanide and a cyanide of a hydrogenating metal to treatment with hydrogen in presence of a free hydrogenating metal, said solution or suspension containing —CN ions as the only acid ions present.

7. Process for the manufacture of methylamine which comprises subjecting an aqueous solution or suspension of an alakli metal cyanide and a cyanide of a hydrogenating metal to treatment with hydrogen in presence of a free hydrogenating metal, said hydrogenating metal being selected from the group consisting of nickel, copper, zinc, iron, cobalt, tin and silver, and said solution or suspension containing —CN ions as the only acid ions present.

8. Process for the manufacture of methylamine which comprises subjecting an aqueous solution or suspension of an alkali metal cyanide and a cyanide of a hydrogenating metal to treatment with hydrogen in presence of a hydrogenating metal selected from the group consisting of nickel, copper, zinc, iron, cobalt, tin and silver in finely divided form, said solution or suspension containing —CN ions as the only acid ions present.

9. Process for the manufacture of methylamine which comprises subjecting an aqueous solution or suspension of a metal cyanide to treatment with hydrogen at temperatures of 70–95° C. and in presence of a hydrogenating catalyst, said solution or suspension containing —CN ions as the only acid ions present.

10. Process for the manufacture of methylamine which comprises subjecting an aqueous solution or suspension of a metal cyanide to treatment at temepratures of 150–200° C. with hydrogen under such pressure that the solution or suspension is near its boiling point and in presence of a hydrogenating catalyst, said solution or suspension containing —CN ions as the only acid ions present.

11. Process for the manufacture of methlyamine which comprises subjecting an aqueous solution or suspension of an alkali metal cyanide to treatment at temperatures of 70–230° C. with hydrogen under such pressure that the solution or suspension is near its boiling point and in presence of a hydrogenating metal selected from the group consisting of nickel, copper, zinc, iron, cobalt, tin and silver, said solution or suspension containing —CN ions as the only acid ions present.

12. Process for the manufacture of methylamine which comprises subjecting a solution or suspension of a cyanide of a hydrogenating metal selected from the group consisting of nickel, copper, zinc, iron, cobalt, tin and silver to treatment at temperatures of 70–230° C. with hydrogen under such pressure that the solution or suspension is near its boiling point, said solution or suspension containing —CN ions as the only acid ions present.

13. Process for the manufacture of methylamine which comprises subjecting an aqueous solution or suspension of an alkali metal cyanide and a cyanide of a hydrogenating metal to treatment at temperatures of 70–230° C. with hydrogen under such pressure that the solution or suspension is near its boiling point in presence of a finely divided hydrogenating metal, said hydrogenating metal being selected from the group consisting of nickel, copper, zinc, iron, cobalt, tin and silver, and said solution or suspension containing —CN ions as the only acid ions present.

HENRY DREYFUS.